Feb. 28, 1967  YUKIO HIRANO  3,306,217
DEVICE FOR OPENING AND CLOSING THE CONTACTS
OF A VEHICLE FUEL PUMP
Filed Aug. 2, 1965  4 Sheets-Sheet 1
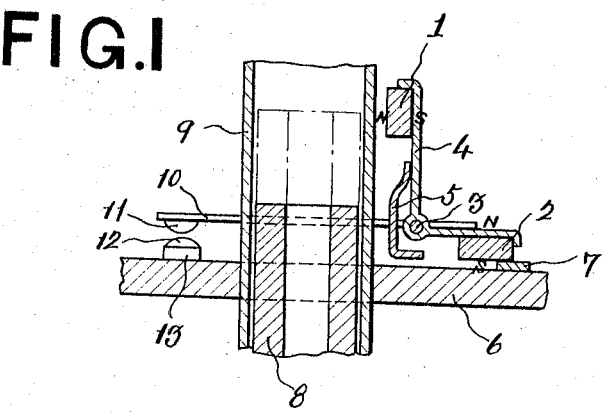
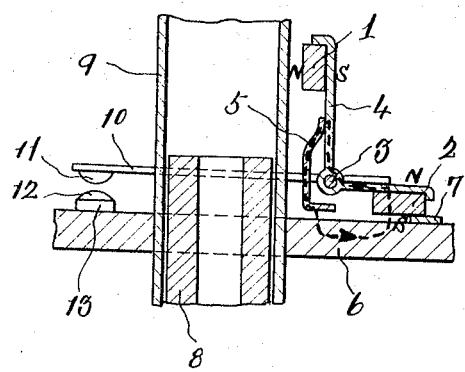
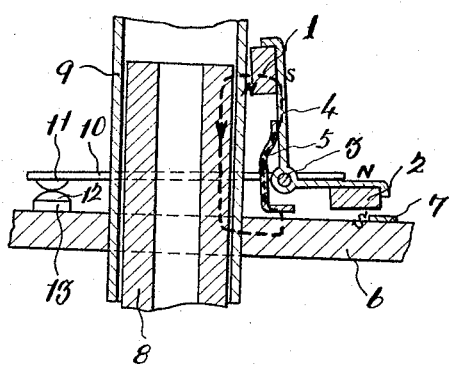

FIG. 3
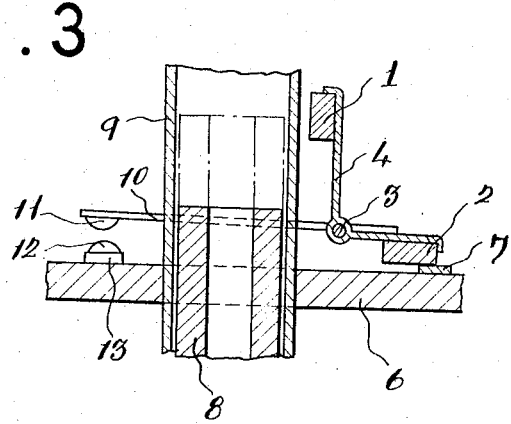
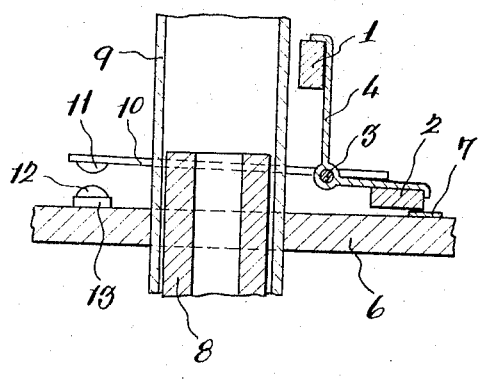
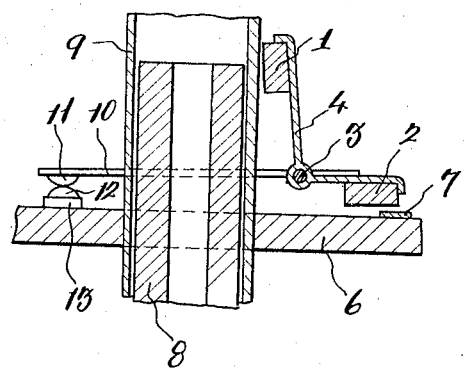

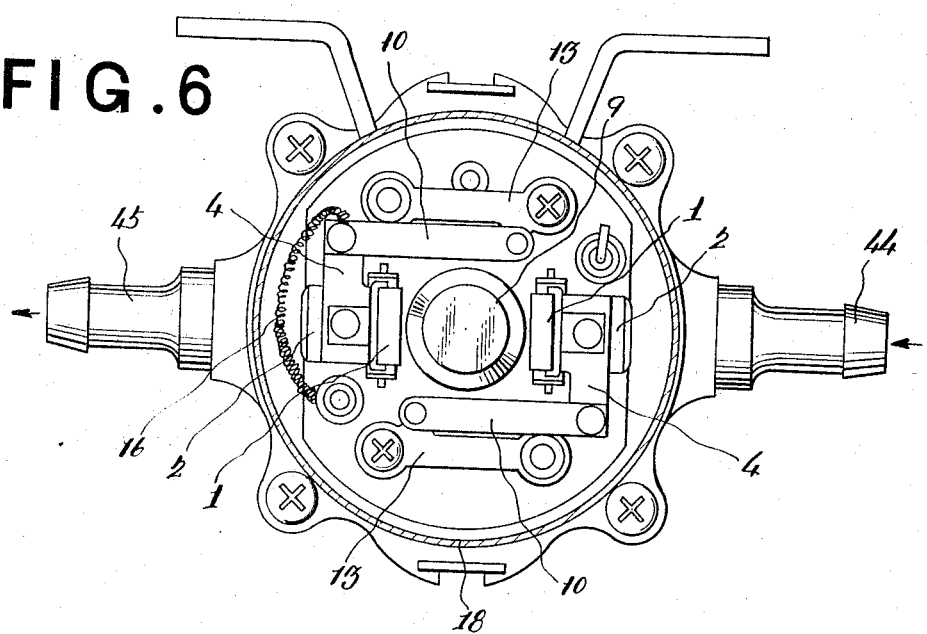
FIG. 6
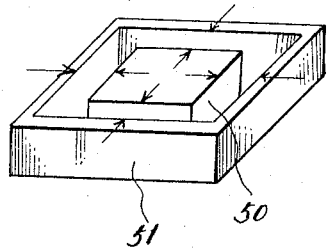
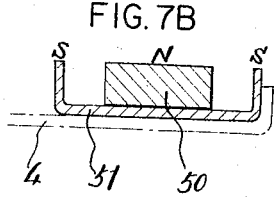

3,306,217
DEVICE FOR OPENING AND CLOSING THE CONTACTS OF A VEHICLE FUEL PUMP

Yukio Hirano, Kiriu, Japan, assignor to Mitsubadenkiseisakusho Co. Ltd., Kiriu, Japan, a corporation
Filed Aug. 2, 1965, Ser. No. 476,418
Claims priority, application Japan, Nov. 11, 1964, 39/86,338; Apr. 19, 1965, 40/22,824
5 Claims. (Cl. 103—53)

The present invention relates to a device for opening and closing the contacts of a fuel pump for use in vehicle and the like. It is an object of the present invention to provide such a device capable of conducting precise opening and closing of the contacts in synchronism with the vertical movement of a plunger in a plunger type fuel pump and the like.

Prior to the present invention there has been known, for example, the devices for opening and closing the contacts in an electromagnetic pump disclosed in U.S. Patent No. 2,472,067, in which a magnet is mounted stationarily in the center of a rocking piece with its polarity opposite from that of a plunger which is magnetized when the current flows to the electromagnetic coil for attracting the plunger, and both ends of the rocking piece are provided with a counterweight. In the apparatus of this type, when the plunger reaches its upper part, the rocking piece is attracted by the plunger due to its leakage flux and the contacts engage with each other, so that the current flows to the electromagnetic coil and the upper part of the plunger is excited to the opposite polarity from the magnet. Accordingly, the attractive adhesive operation between the magnet and plunger is strengthened thereby conjointly with the effect due to the weight of counterweight. When the plunger descends, the attractive force of the lower part of the rocking piece increases and its position moves and the contacts disengage from each other.

However, the apparatus having the above-mentioned structure has the following disadvantages.

(1) Since this apparatus consists of a magnet, magnetic forces of the upper and lower poles at both rocking limit positions of the rocking piece are equivalent. Accordingly, it is necessary to make the space between the plunger and yoke larger than that between the rocking piece and plunger, which thus reduces the attractive force of the lower part of the pole and further there is a need to balance the weight by providing a counterweight. In short, the regulation thereof is very difficult. It is impossible to secure the precise operation which is suitable to the heavily vibrating vehicles by simple regulation.

(2) The apparatus is disadvantageous since the formation of a magnet circuit operates in the direction of reducing the attractive force of the magnet and plunger.

(3) Since the apparatus is provided with a magnet, it is impossible to control the attractive force thereof.

(4) Since the apparatus is provided with a magnet, it results in using a large-size one and accordingly the cost is expensive.

(5) The apparatus has a basic disadvantage that it is weakened by the vibration as the result of the above-mentioned articles (1) and (2).

The present invention is purposed to eliminate the above-mentioned deficiencies and it has the following characteristics.

The first characteristic of the present invention is that by the employment of two magnets the apparatus can be made of reduced size with low cost and the spaces can be readily adjustable. Thus a device for opening and closing the contacts which is precise in operation and extremely strong against the vehicle vibration without the use of a counterweight can be obtained.

The second characteristic of the present invention is that by the use of an L-shaped rocking piece two magnets are mounted stationarily at both ends of the arm of said rocking piece to cause alternate operation, and by varying the length of said arm the adjustment of the space is facilitated using the magnets having the same strength so that the desired rate of attractive operation can be obtained by the two magnets, thus adjustment of the spaces being exceedingly facilitated.

The third characteristic of the present invention is that the L-shaped rocking piece which is made of magnetic material is provided with an auxiliary plate, and by the formation of a magnetic circuit by means of the auxiliary plate the attractive force in the case of the magnet singly is remarkably increased, thus a strong and precise operation of opening and closing the contacts being possible.

Further the fourth characteristic of the present invention resides in the structure of magnets in which a case made of magnetic material is provided surrounding the central magnet, whereby an attractive force about three times as large as that produced by a single magnet is formed.

Other features of the present invention will be apparent from the following description taken in connection with the accompanying drawings, in which:

FIG. 1 is a side view in vertical section showing the essential part of a pump constituting a preferred embodiment of the invention;

FIG. 2A and FIG. 2B are diagrams in explaining the operation of the said mechanism of FIG. 1;

FIG. 3 is a side view in vertical section showing the essential part of the device in a modified embodiment of the invention;

FIG. 4A and FIG. 4B are diagrams in explaining the operations of the mechanism of FIG. 3;

FIG. 6 is a section of the same view taken substantially on the line A—A of FIG. 5; and FIG. 7A is an oblique section and FIG. 7B is a vertical sectional side view respectively showing a special structure of the contacts.

Figure 5:
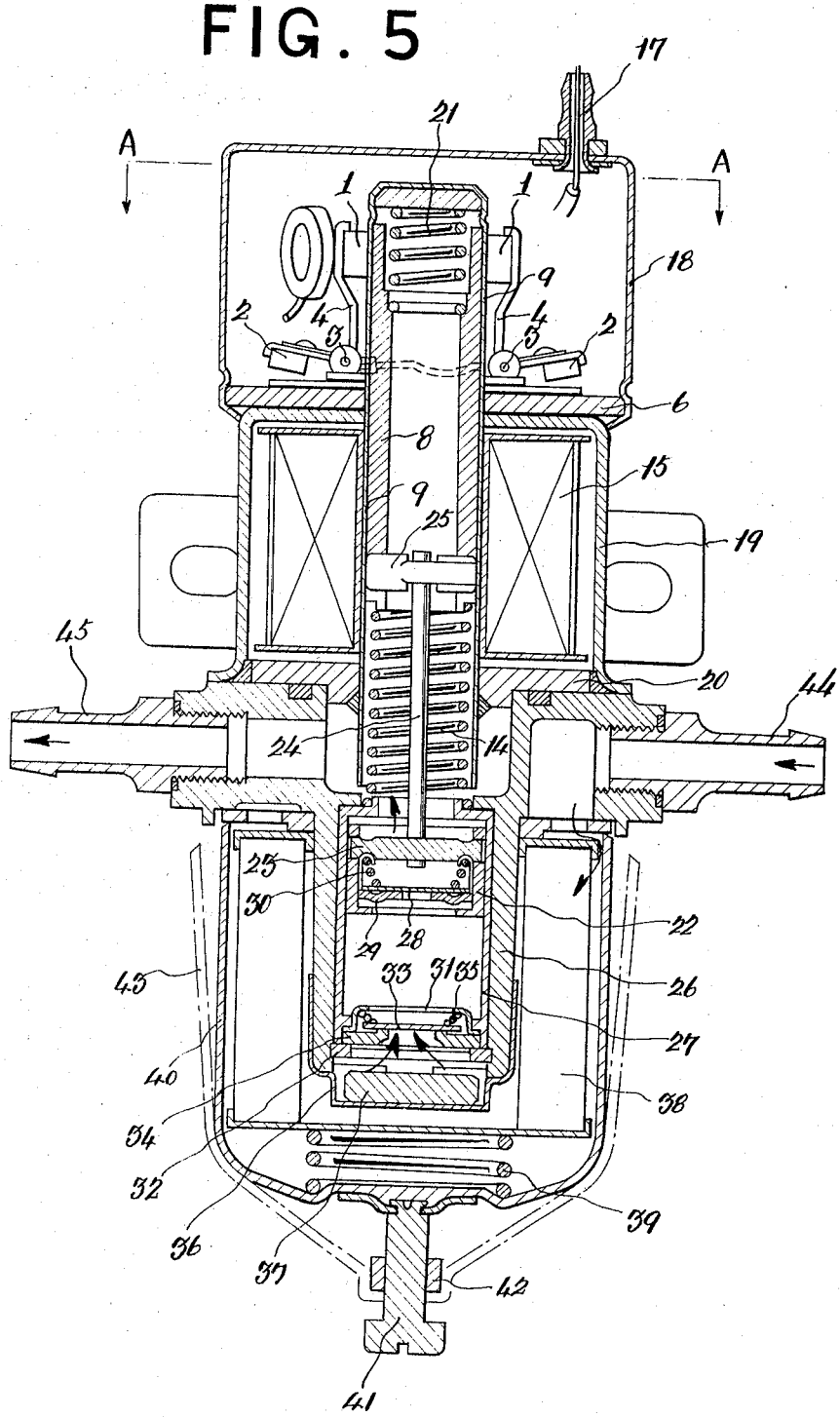
FIG. 5 is a side view in vertical section showing the device according to the present invention applied to a fuel pump for vehicles.

In FIG. 1, FIG. 2A and FIG. 2B of the drawing, reference numerals 1 and 2 designate magnets respectively, 3 a branch shaft, 4 a rocking piece of magnetic material, 5 an auxiliary plunger, 6 a yoke, 7 a stopper, 8 a hollow magnetic plate, 9 a cylinder of non-magnetic material, 10 a contact plate, 11 and 12 contacts, and 13 an insulating stand.

The L-shape rocking piece 4 is pivotally mounted on the yoke 6 made of iron by means of the branch shaft 3, magnets 1 and 2 being provided on the forward ends of the two rectangular arms of the said rocking piece 4 so as to give the polarity as indicated in the drawing. The two arms of the rocking piece 4 are so constituted that the arm mounted on the magnet 1 is longer than that mounted on the magnet 2. The auxiliary plate 5 has an L-shape section, a part of which is fastened to the rocking piece 4, and constitutes two magnetic circuits as indicated in FIG. 2A and FIG. 2B according to the rocking position of the rocking piece, whereby the fixing force is increased at the time of being attracted. A plunger 8 is installed so as to slide smoothly in the cylinder 9 adjacent to the magnet 1 in a slightly spaced relationship.

FIG. 3, FIG. 4A and FIG. 4B show a modification of the above-mentioned embodiment. In this instance, the rocking piece is made of non-magnetic material. Though this example is different from the above-mentioned example in providing no auxiliary plate 5 and using the rocking piece 4 of non-mangetic material, it is identical to the latter in utilizing the attractive power of the magnets and the force of a lever.

The mode of operation will be illustrated by referring to the above-mentioned example hereinbelow.

In FIG. 3, FIG. 4A and FIG. 4B, the rocking piece 4 of non-magnetic material has no auxiliary plate 5. In this case, as indicated in FIG. 4A, the magnet 2 is attracted to the yoke 6 by its inherent magnetic force and fixed to the predetermined position of the yoke by means of the stopper 7. At this state the contacts 11 and 12 are open.

The plunger 8 is pushed up by the compressive force of a plunger spring 14 which will be described hereinbelow and reaches the position indicated in phantom in FIG. 3. This position is identical with the position indicated in FIG. 4B. If the space between the magnet 1 and cylinder 9 and that between the magnet 2 and yoke 6 are arranged almost identical and the magnetic strength of the magnets 1 and 2 is equivalent, a lever action is imparted to the rocking piece and the manget 2 is disengaged from the yoke 6 while the magnet 1 is attracted to the plunger 8. Accordingly the contact 11 fixed on contact plate 10 descends and engages with the contact 12.

When the current flows to the electromagnetic coil 15 which will be described hereinbelow by the above-described contact, the plunger 8 is attracted and descends in resistance to the compressive force of the spring 14, and reaches the state of FIG. 4A. At this state, the attractive forces of magnet 1 and plunger 8 are nullified, while the attractive forces of the magnet 2 and yoke 6 become larger than the former, so that the magnet 1 and plunger 8 come into proximity with the stopper 7. At this state, the contacts 11 and 12 are opened and the current passing through the magnetic coil 15 is broken off, and the plunger 8 is pushed upwardly by the force of the spring 14, thus the state of FIG.4B is accomplished, this operation being repeated.

The operation of the mechanism indicated in FIG. 1 and FIG. 2A and FIG. 2B is illustrated hereinbelow. In this example, the rocking piece 4 is made of magnetic material and the auxiliary plate 5 of magnetic material is provided thereon. Accordingly, besides cooperative operation of magnetic force of the magnet and lever action, further stronger attractive operative is imparted to the magnet by the formation of a magnetic circuit due to the presence of the auxiliary plate 5. That is, a magnet circuit as indicated in FIG. 2A and FIG. 2B corresponding to the state as indicated in FIG. 4A and FIG. 4B is formed. This new attractive force caused thereby is substantially greater than the attractive force singly caused by the magnet 1 or 2. In the case of FIG. 4B, a magnetic circuit in the direction of the arrow is formed between the magnet 1, plunger 8, yoke 6, auxiliary plate 5 and rocking piece 4. The attractive force of the magnet 1 is increased, and thus attracted to the plunger 8, thereby the contact 11 is brought into contact with the contact 12. Also in FIG. 4A a magnet circuit in the direction of the arrow is formed between the magnet 2, rocking piece 4, auxiliary plate 5 and yoke 6, and the attractive force of the magnet 2 is increased and strongly attracted to the yoke 6 and strongly pressed against the stopper 7. Thus the contact 11 is disengaged sufficiently from the contact 12. In this case, since the attractive force of the magnet is increased, the apparatus of small size can be used and simultaneously its vibration resisting property is elevated, thereby stable operations are certainly obtained in defiance of the vibration of vehicles.

FIG. 5 and FIG. 6 show the structure of a fuel pump for use in vehicles as an example of applying the mechanisms for opening and closing contacts according to the present invention. In the drawings like parts are designated by like reference numerals as in the above-described examples. Reference numeral 14 designates a plunger spring 15, electromagnetic coil, 16 ground wire, and 17 terminal. The above-described device for opening and closing the contacts is housed in a cover 18. Reference numeral 19 designates a yoke cover, which tightly houses end yokes 6 and 20 and the electromagnetic coil 15 at the lower portion of the said cover 18. The aforesaid cylinder 9 of non-magnetic material penetrates through both end yokes 6 and 20 to project downwardly, and houses the plunger 8 freely slidably and places it under the influence of the plunger spring 4 and damper spring 21. Reference numeral 22 designates a piston provided in the plunger 8 by means of connecting elements such as a pin 23, a rod 24, a pin 25, and slides within the pump cylinder 27. Reference numeral 28 designates a discharge valve, 29 a discharge valve seat, 30 a discharge valve spring, and they are incorporated in the piston 22. At the lower end of the pump cylinder there is provided an inlet valve 33, an inlet valve seat 34 and an inlet valve spring 35 retained between a valve case 31 and a circular clip 32. Reference numeral 36 is a level cap, which is set at the lower end of a pump frame 26 to form an inlet, and a magnet 37 is attached thereto. Reference numeral 38 is a strainer, 39 a strainer spring, 40 a strainer case, 41 a lock bolt, 42 a lock nut, and 43 a lock spring. In the fuel pump having the aforesaid structure, in accordance with the operations as described above the plunger 8 repeats its vertical movements by the attractive force of the electromagnetic coil 15 and hoisting force of the spring 14. In this instance, the damper spring 21 serves for facilitating the smooth movement.

The vertical movement of the plunger 8 causes the piston to move vertically, whereby fuel is fed through an inlet pipe 44, passing through cylinder 27 in the direction of arrow, and is discharged through an outlet pipe 45.

FIG. 7A and FIG. 7B show the magnet which exhibits remarkable effect when used in the present invention. In the present invention it is desirable to use a magnet of small size and light weight having strong attractive operation, but it cannot be expected to obtain remarkable effect when the magnet having general structure is used. When a case 51 of magnetic material is provided by maintaining a certain gap with the magnet 50 as shown in FIG. 7 and the forward ends of the magnet and the case are placed on the same plane, polarity as shown, for example, in FIG. 7B is produced, whereby it has been found that the attractive force about three times as large as that of the conventional well-known single magnet can be obtained by the same magnet. When this structure is applied to the device for opening and closing the contacts, although remarkably small in size and light in weight it can secure exceedingly strong and stable operations.

Although but two embodiments of the invention have been shown and described in detail, it will be understood that other embodiments are possible and that various changes may be made in the design and arrangement of the parts without departing from the spirit of the invention.

What is claimed is:

1. In a mechanism provided with a reciprocating part of magnetic material such as a plunger of fuel pump and the like, an electromagnetic coil for attracting said reciprocating part against the compressive force of spring, and contacts for opening and closing the circuit of said electromagnetic coil, a device for opening and closing the contacts in the fuel pump for use in vehicles, in which an L shaped rocking piece of magnetic material is used and a magnet is fixed on each forward end of two arms thereof, an auxiliary plate of magnetic material being protruded from a part thereof, the end of a contact plate being mounted in said rocking piece, thereby precise opening and closing operation is effected by lever action of two magnets and rocking piece.

2. A device for opening and closing the contacts of a fuel pump for use in rolling stocks as set forth in claim 1 in which the length of two arms is not equal so as to facilitate the adjustment of the space using the magnets having the same strength.

3. A device for opening and closing the contacts of a fuel pump for use in rolling stocks as set forth in claim 1 in which a case of magnetic material is provided surrounding each of two magnets, whereby the attractive force about three times as large as that of the single magnet can be obtained.

4. In a mechanism provided with a reciprocating part of magnetic material such as a plunger of a fuel pump and the like, an electromagnetic coil for attracting said reciprocating part against the compressive force of a spring, and contacts for opening and closing the circuit of said electromagnetic coil, a device for opening and closing the contacts in said fuel pump for use in vehicles comprising an L shaped rocking piece, a magnetic fixed on the forward end of each of the two arms of said rocking piece, one end of a contact plate mounted on said rocking piece, whereby precise operation is effected by the lever action of the two magnets and rocking piece, said two arms of said rocking piece being unequal in length so as to facilitate the adjustment of the space using the magnets of the same strength.

5. In a mechanism provided with a reciprocating part of magnetic material such as a plunger of a fuel pump and the like, an electromagnetic coil for attracting said reciprocating part against the compressive force of a spring, and contacts for opening and closing the circuit of said electromagnetic coil, a device for opening and closing the contacts in said fuel pump for use in vehicles comprising an L shaped rocking piece, a magnet fixed on the forward end of each of the two arms of said rocking piece, one end of a contact plate mounted on said rocking piece, whereby precise operation is effected by the lever action of the two magnets and rocking piece, and a case of magnetic material surrounding each of said magnets whereby an attractive force of about three times as large as that of a single magnet without the case can be obtained.

References Cited by the Examiner
UNITED STATES PATENTS

| | | | |
|---|---|---|---|
| 2,481,147 | 9/1949 | Parker et al. | 310—18 |
| 2,701,331 | 2/1955 | Holst | 103—53 X |

ROBERT M. WALKER, *Primary Examiner.*